US007826135B2

(12) United States Patent
Destain et al.

(10) Patent No.: US 7,826,135 B2
(45) Date of Patent: Nov. 2, 2010

(54) SCREEN FILM FOR LIGHT PROJECTION BRIGHTNESS ENHANCEMENT

(75) Inventors: Patrick R. Destain, Allen, TX (US); James F. Hallas, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 190 days.

(21) Appl. No.: 12/254,446

(22) Filed: Oct. 20, 2008

(65) Prior Publication Data

US 2010/0097699 A1 Apr. 22, 2010

(51) Int. Cl.
G03B 21/56 (2006.01)
G03B 21/60 (2006.01)

(52) U.S. Cl. ........................ 359/449; 359/454; 359/459

(58) Field of Classification Search .................. 359/443, 359/449, 454, 460, 459
See application file for complete search history.

(56) References Cited

U.S. PATENT DOCUMENTS

| | | | |
|---|---|---|---|
| 6,525,877 B1 * | 2/2003 | Clabburn et al. ............ 359/443 |
| 7,649,687 B2 * | 1/2010 | Shimoda et al. ............. 359/449 |
| 2004/0114230 A1 * | 6/2004 | Peterson et al. ............. 359/460 |
| 2009/0046361 A1 * | 2/2009 | Itoh et al. .................... 359/459 |
| 2009/0153958 A1 * | 6/2009 | Huibers et al. .............. 359/459 |

* cited by examiner

Primary Examiner—Christopher Mahoney
(74) Attorney, Agent, or Firm—Wade James Brady, III; Frederick J. Telecky, Jr.

(57) ABSTRACT

A front-projection screen that includes a prismatic film that comprises an outside surface of the screen. The film includes parallel prismatic grooved lines. Each of the lines have a draft surface, a groove surface, and, each of the lines are located on a first side of a base portion of the film. The screen also includes a diffuser-reflector layer adjacent to a second opposite side of the base portion. The outside surface of the screen is oriented to receive an incoming light exclusively through the draft surfaces of the lines. The incoming light has an angle of incidence of about 60 degrees or greater with respect to the normal of the outside surface. A draft-base angle between the base portion and the draft surface is about 75 degrees or greater.

20 Claims, 4 Drawing Sheets

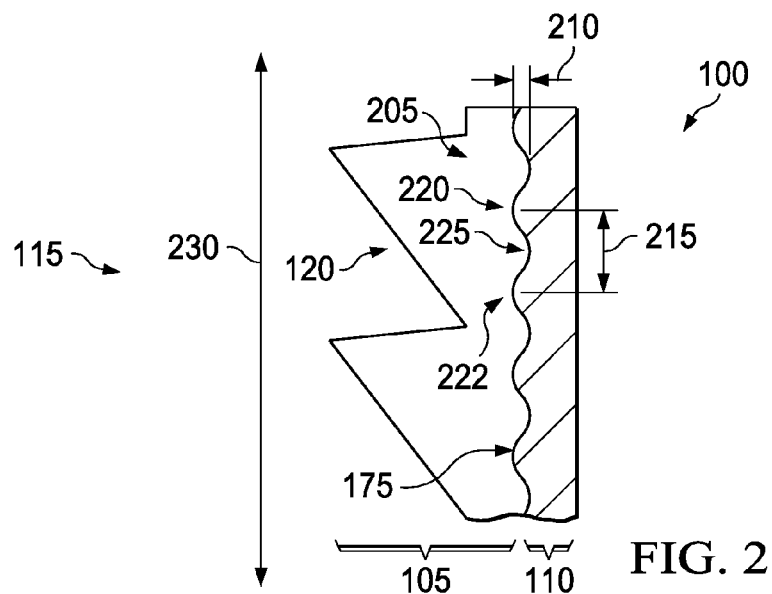
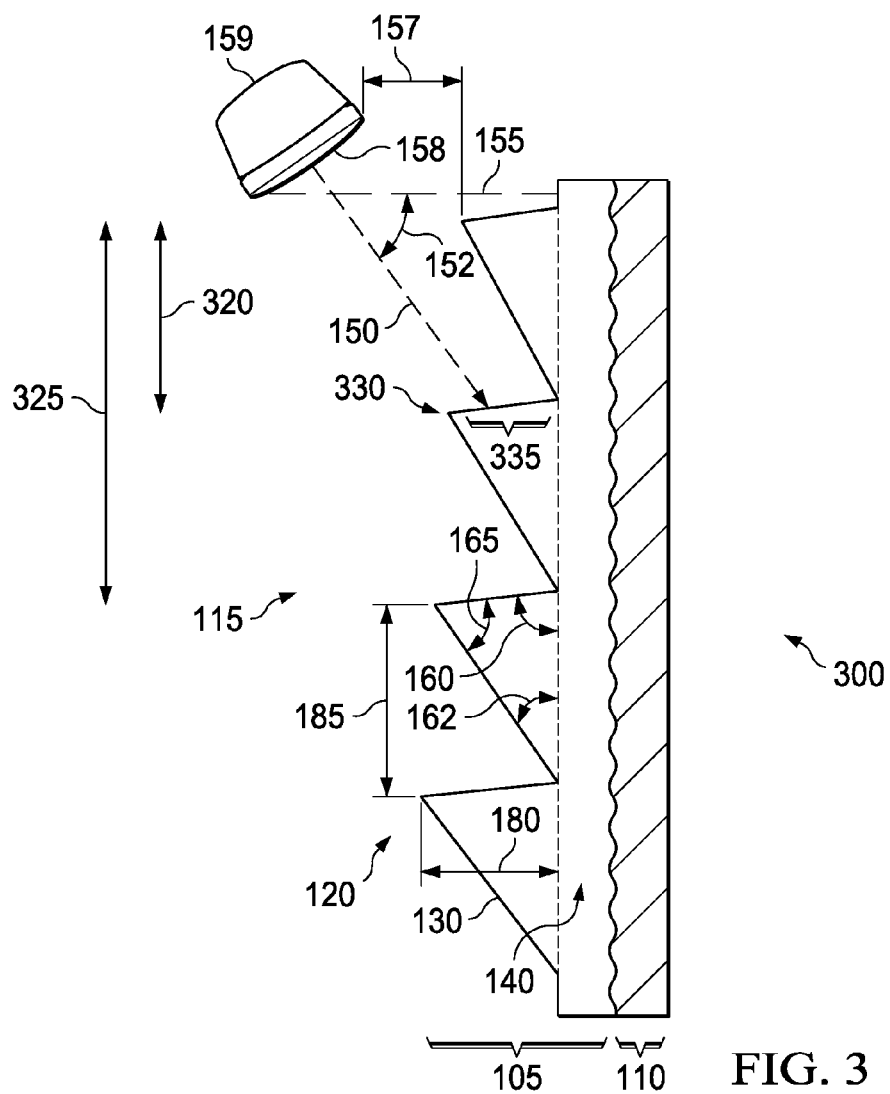

SCREEN FILM FOR LIGHT PROJECTION BRIGHTNESS ENHANCEMENT

TECHNICAL FIELD OF THE INVENTION

The invention is directed, in general, to projection video display (PVD) systems and, more specifically, to a front-projection screen for a PVD system, a method of front-projection collimation and a PVD system incorporating the front-projection screen or the method.

BACKGROUND OF THE INVENTION

Projection video display (PVD) systems based on digital mirror devices (DMDs) have become quite popular due, in part, to their accurate color rendition, resolution, display size and cost. For DMD-based front-projection PVD systems, the projection mechanism and a viewer are on the same side of the screen. To avoid key-stoning effects, DMD-based front-projection PVD systems often project light beams from the projection mechanism to the screen using a low angle of incidence (AOI) with respect to the normal of the incidence plane of the screen.

The use of a low AOI can be problematic, however. For instance, the viewer cannot interact closely with the projected image. If the viewer approaches the image, the viewer can block the projected image and cast a shadow on the screen. To facilitate closer viewer interaction, projection mechanism can be brought closer to the screen, e.g., closer and above, or, closer and below, the screen. However, a shorter throw distance between the projection mechanism and screen is associated with a higher AOI. Projecting light with a high AOI can, in turn, result in decreased brightness of the image projected on the screen. Moreover, the brightness of the projected image can be non-uniform across the screen.

What is needed in the art is a screen, and a front-projection PVD system using such a screen, that can minimize such specular reflection and enhance screen brightness.

SUMMARY OF THE INVENTION

To address the above-discussed deficiencies of the prior art, one embodiment is a front-projection screen. The front-projection screen includes a prismatic film that comprises an outside surface of the screen. The film includes parallel prismatic grooved lines. Each of the lines have a draft surface, a groove surface and each of the lines are located on a first side of a base portion of the film. The screen also includes a diffuser-reflector layer adjacent to a second opposite side of the base portion. The outside surface of the screen is oriented to receive an incoming light exclusively through the draft surfaces of the lines. The incoming light has an angle of incidence of about 60 degrees or greater with respect to the normal of the outside surface. A draft-base angle between the base portion and the draft surface is about 75 degrees or greater.

Another embodiment is method of front-projection. The method includes providing the above-described screen and orienting the screen such that the outside surface receives light from a front projecting mechanism exclusively through the draft surfaces of the lines, when the incoming light has the above-described angle of incidence. The method further includes, for substantially all of the light, refracting the light from the draft surfaces to the groove surfaces, reflecting from the grooved surface to the diffuser-reflector layer, and reflecting the groove-surface-reflected light from the diffuser-reflector layer and out of the film to a viewer location. The view location is on a same side as the front projecting mechanism and, wherein the diffuser-reflector-layer-reflected light has reduced divergence in a vertical dimension as compared to a horizontal dimension the of screen.

Yet another aspect of the invention provides a PVD system. In one embodiment, the PVD system includes: a projection mechanism and the above-described screen. The projection mechanism includes a light source configured to generate light, a projection structure, a digital micro-mirror device (DMD) configured to receive and reflect portions of said light toward or away from said projection structure, and DMD control circuitry coupled to the DMD and configured to control the DMD in response to data derived from a video stream.

BRIEF DESCRIPTION OF THE DRAWINGS

For a more complete understanding of the invention, reference is now made to the following descriptions taken in conjunction with the accompanying drawings, in which:

FIG. 2 shows a detailed cross-sectional view of an example embodiment of the front-projection screen of FIG. 1, showing an embodiment of the diffuser-reflector layer;

FIG. 3 shows a cross-sectional view of an alternative example embodiment of the front-projection screen of the disclosure;

DETAILED DESCRIPTION

The embodiments of the present disclosure benefit from the recognition that the decreased brightness of images associated with front screen projection at a high AOI occurs because less light is diffusively reflected back to the viewer. It was further recognized that light that is not diffusively reflected back to the view can be specularly reflected off of such screens to the ceiling or floor of a room that the PVD system is located in. The increased ambient lighting from such specularly reflected light, in turn, can detrimentally reduce contrast in the projected image.

As part of the present disclosure, it was recognized that a front projection screen comprising a prismatic film and diffuser-reflector layer behind the prismatic film can be configured to minimize specular reflection and increase Lambertian reflectance. Instead of specularly reflecting off of the screen to the ceiling or floor, the light can be redirected to the viewer, thereby providing a uniformly brighter and greater contrast image. These features can be achieved using an ultra-steep AOI and shorter throw distance than previously possible.

Figure 1:
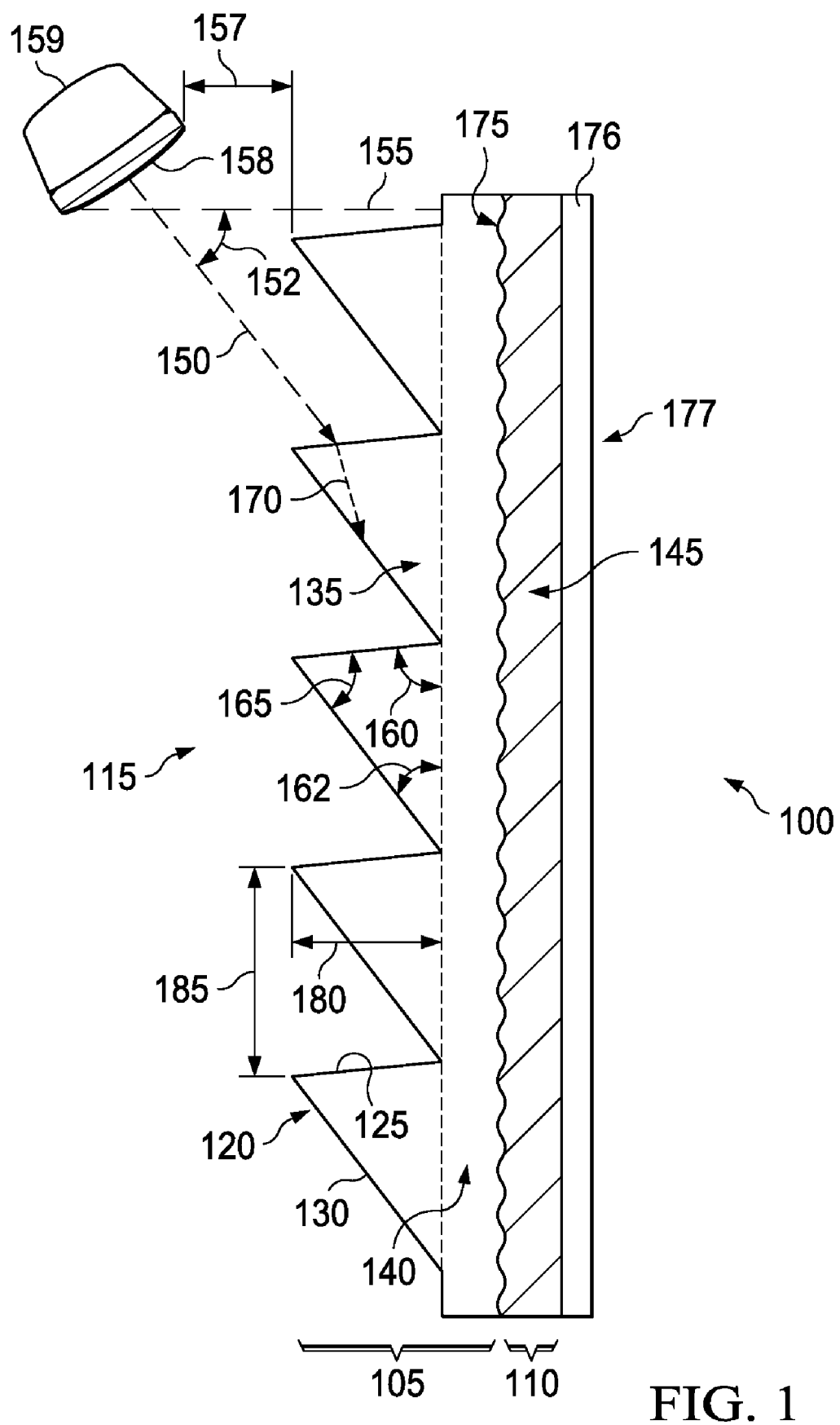
FIG. 1 is a cross-sectional view of an example front-projection screen constructed according to the principles of the disclosure.

FIG. 1 is a cross-sectional view of a portion of an example front-projection screen 100 constructed according to the principles of the disclosure. The screen 100 comprises a prismatic film 105 and a diffuser-reflector layer 110.

The film 105 comprises an outside surface 115 of the screen 100. The film 105 includes parallel prismatic grooved lines 120. Each of the grooved lines 120 have a draft surface 125 and a groove surface 130. Each of the grooved lines 120 are located on a first side 135 of a base portion 140 of the film 105. The diffuser-reflector layer 110 is adjacent to a second side 145 of the base portion 140, the second side being opposite the first side 135 that the grooved lines 110 are located on. In some cases, as shown in FIG. 1, the diffuser-reflector layer 110 directly contacts the second side 145 of the base portion 140. In other cases, there can be a gap (e.g., an air gap) between the second side 145 and the layer 110.

The outside surface 115 of the screen 100 is oriented to receive an incoming light 150 exclusively through the draft surfaces 125 of the lines 120. For clarity, only a single principal ray of the light 150 is shown. The incoming light 150 having an angle of incidence 152 (AOI) of about 60 degrees or greater with respect to the normal 155 of the outside surface 115. For example, for some embodiments of the screen 100, the AOI 152 is a value in a range from at least about 60 degrees to less than 90 degrees, and more preferably about 80 degrees or greater to less than 90 degrees.

In is preferable to have as great an AOI 152 as possible so as to minimize the throw distance 157 between the screen 100 and a projection structure 158 (e.g., a lens or mirror or other structure that the light 150 is projected out of to the screen 100) of a projection mechanism 159. One skilled in the art would understand that the relationship between the AOI 152 and throw distance 157 is given by the formula: AOI=arctan (1/TR), where TR is the throw ratio. The throw ratio is equal to the throw distance 157 divided by the diagonal distance of the screen 100 (not shown).

A high draft-base angle 160 facilitates redirecting the light 150 with a uniform increased intensity (compared to a screen without the prismatic film 105) to a viewer (not shown) in front of the screen 100. For instance, the draft-base angle 160 between the base portion 140 and the draft surface 125 is preferably about 75 degrees or greater. In some embodiments, the draft-base angle 160 is in a range from about 75 to 90 degrees, and more preferably, about 86 to 88 degrees.

The prismatic film 105 is configured to internally reflect substantially all (e.g., at least about 90 percent) of the light 170 refracted to the groove surfaces 130. For example, in some preferred embodiments, each of the groove surfaces 130 are substantially total-internal-reflection (TIR) surfaces with respect to the light 170 refracted from the draft surfaces 125 to the groove surfaces 130. As used herein the term substantially TIR surface means that that at least about 90 percent of the light 170 refracted from the draft surface 125 is internally reflected by the grooved surface 130. Or equivalently, less than about 10 percent of the light 170 refracted from the draft surface 125 passes directly through the groove surface 130.

To facilitate the groove surfaces 130 being a TIR surface, a groove-base angle 162 between the base portion 140 and the groove surface 130 of the lines 120 is preferably about 50 degrees or less. In some preferred embodiments, the groove-base angle 162 is in a range from about 40 to 50 degrees, and more preferably, about 43 to 45 degrees. To facilitate such reflection from the groove surface 130, a cross-section through the prismatic grooved lines 120 is substantially in the shape of an acute triangle, e.g., a triangle where all the internal angles 160, 162, 165 are less than 90 degrees.

The diffuser-reflector layer 110 can be a diffuser, a reflector, or, both. In some preferred embodiments, a surface 175 of the diffuser-reflector layer 110 adjacent to the second side 145 of the film 105 can be one of: a smooth substantially diffusive surface, a substantially reflective roughen surface.

One skilled in the art would be familiar with procedures to define the degree of diffusive and specular reflectivity of a layer. For example, an input beam of collimated light (e.g., a light from a laser light source) of known cross-sectional area and intensity ($I_{source}$) can be directed towards a layer at some known angle of incidence. Specularly-reflected light will reflect off of the layer at an angle of reflection that is the opposite of the angle of incidence, and, will fall with an area that is approximately equal (e.g., within ±10 percent) to the cross-sectional area of the area. If the ratio of the intensity of the output specularly reflected light ($I_{specular}$) to $I_{source}$ is a value in the range from greater than about 0.9, then the layer is considered to be a substantially specular reflective surface. If the $I_{specular}/I_{source}$ ratio has a value of less than about 0.1, then the layer is considered to be a substantially diffusive reflective surface. If the $I_{specular}/I_{source}$ ratio has a value in the range of about 0.1 to 0.9 then the layer is considered to be a substantially partially diffusive and partially reflective surface.

A white mat diffuser is an example of a diffuser-reflector layer 110 having a substantially diffusive surface 175. A metallic grey coating having a substantially reflective roughen surface 175, is an example of a diffuser-reflector layer 110 having a substantially partially diffusive and partially reflective surface. A smooth metal surface is an example of a substantially secular reflective surface.

In some cases where the surface 175 is substantially diffusive, the diffuser-reflector layer 110 can be, or include, a volume diffuser. The term volume diffuser as used herein means that at 10 percent of the light substantially penetrates the surface 175 and goes into the volume of the layer 110 before returning out of the surface 175. In some cases, a volume diffuser can cause undesirable blurring of an image projected from the screen 100. Blurring can occur because light penetrating the surface 175 of the volume diffuser become scattered by diffusive particles (e.g., metal particles) that are suspended in the bulk material (e.g., glass or plastic) of the volume diffuser.

In some cases, the diffuser-reflector layer 110 configured as a volume diffuser can include a reflective layer 176 laminated to the back side 177 of the layer to increase the diffusion efficiency of light reflectance to a viewer by folding the light path back through the layer 110. For example, the diffuser-reflector layer 110 configured as a volume diffuser can includes or be a paint, and in some cases can further includes a reflective layer 176 to improve reflectance. Some preferred embodiments of paints exhibit a Bi-Directional Reflective Diffusion function of less than about $1/\pi$ and in some cases as low as about $3 \times 10^{-3}$ (1/steradian units).

In some cases, when the surface 175 is a substantially reflective roughen surface layer 110 is or includes a hammered reflector layer. Preferably the surface 175 is a reflective surface with random roughness. That is, the surface irregularities that impart the surface with roughness, can have a random size and shape. In some preferred embodiments, the surface irregularities are substantially smaller than the image size of a single pixel. For example, in some cases each irregularity is preferably about 0.2 to 0.1 of the target pixel size. It is also beneficial for the spatial frequency the surface irregularities to be sufficiently large to cause diffuse reflection of light from the surface 175. For example the irregularities that are about 0.2 to 0.1 of the pixel size substantial cover the either surface 175.

In some embodiments, the surface irregularities can be characterized by the local normal to the surface distribution can be given by: [s*cos(u),s*sin(u),sqrt(1−s^2)] with −1<s<1, −π<u<π, where u is a randomly distributed number and s is a random number determined by the given slope distribution (RMS and probability function). Slope angle are preferred to be in the ±15 degrees range but could be steeper if desired.

FIG. 2 shows a more detailed cross-sectional view of the film to better show aspects of certain embodiments of the diffuser-reflector layer 110. FIG. 2 illustrates aspects of the diffuser-reflector layer 110 where the surface 175 is roughened, such as when the surface 175 is a substantially reflective roughened surface. To provide adequate light sampling of the pixel, it is desirable for the surface irregularities, here depicted as raised micro-features 205, to be substantially smaller than the target pixel area of light 150 to be projected on the screen. E.g., in some preferred embodiments, the micro-features 205 are about 0.1 to 0.2 the size of a pixel. Additionally, in some cases to avoid Moire effects, it is advantageous for the micro-features 205 to be randomly distributed over the surface 175.

In some embodiments, for example, the surface 175 includes micro-features 205 that can be characterized by peak-to-valley distances 210 and peak-to-peak distances 215 for adjacent peaks 220, 222 with an intervening valley 225. In some preferred embodiments, both the average peak-to-valley distance 210 and average peak-to-peak distance 215 are about 0.1 or less than a target pixel dimension 230 to be projected on the screen 100. Consider, for example, the case when the target pixel dimension 230 is about 1000 microns (e.g., the vertical and horizontal dimensions of the pixel are 1000 microns by 1000 microns, or 1 $mm^2$, respectively). For this example, the average peak-to-valley distance 210 and the average peak-to-peak distance 215 preferably have values of about 100 microns or less.

However, it is also desirable for the micro features 205 to be small enough (but not too small to avoid Rayleigh scattering) to avoid geometric scattering of the light projected onto the screen. Geometric scattering can be manifested to a view as an undesirable rainbow colored reflection on at least a portion of the screen 100. Continuing with the above example, in some preferred embodiments, the average peak-to-peak distance 215 is such that the following relationship holds: $\pi D/\lambda \sim 1$. D is the average distance 215, $\lambda$ is an average wavelength of the incoming light 150 and ~ means ±25 percent. For example, when $\lambda$ equals 0.5 micron, the peak-to-peak distance (215 is preferably at least about 0.15±0.038 microns. In contrast, if $\pi D/\lambda >> 1$ (e.g., $\pi D/\lambda$_equals about 2 or more) then there can be substantial amounts of undesirable geometric scattering. If $\pi D/\lambda << 1$, (e.g., $\pi D/\lambda$ equals about 0.1 or less), there can be substantial color sensitive (Rayleigh) scattering as well.

As further illustrated in FIG. 1, in some embodiments, each of prismatic grooved lines 120 can have substantially identical dimensions for the entire screen 100. E.g., the prism height 180 and prism pitch 185 for each of the lines 120 of the screen 100 can be substantially the equal to each other. E.g., each height 180 can be the same within about ±10 percent and each pitch 185 can be the same within about ±10 percent. E.g., in some preferred embodiments, the height 180 equals about 200±20 microns, and, the pitch 185 equals about 200±20 microns. E.g., in some preferred embodiments, the height 180 equals about 50±5 microns, and, the pitch 185 equals about 50±5 microns.

In such cases, the draft-base angle 160 and the groove-base angle 162 are also both constant for each of the lines 120 of the screen 100. E.g., each of the draft-base angles 160 are the same within about ±10 percent and each of the groove-base angles 162 are the same within about ±10 percent. In some embodiments, e.g., the draft-base angle 160 and groove-base angle 162 are about 88 degrees+2, −8 degrees and about 47 degrees±5 degrees, respectively, for all of the grooved lines 120. Ease of manufacture is one benefit of having lines 120 with substantially identical dimensions for the entire screen 100. For example, such a prismatic film 105 could be manufactured as a continuous roll and then cut at any location in the roll without concerns over making screens 100 with substantially different reflective properties. Another advantage of a constant-angle film is that there is no need for registering particular positions on the screen 100 and particular pixels of an image to be projected on the screen.

FIG. 3 shows a cross-sectional view of a portion of an alternative embodiment of a screen 300. The same reference numbers are used as in FIG. 1 to show analogous features. For the embodiment shown in FIG. 3, prismatic grooved lines 120 of the film 105 do not have substantially identical dimensions for the entire screen 300. Rather, the dimensions (e.g., draft height 180 and pitch 185) of the lines 120 increase in size as a function of an increasing distance away from the incoming light 150. In such embodiments, each of the line's 120 dimensions can remain constant relative to each other. In some cases, the dimensions increase as a function of an increasing AOI 152 of the incoming light 150.

For instance, as illustrated in FIG. 3, lines 120 that are a closer distance 320 from the incoming light 150 have a smaller groove height 180 and groove pitch 185 than lines 120 that are a farther distance 325 away from the light 150. However, for each of the line's 120 dimensions to remain constant relative to each other, the ratio of the groove height 180 to groove pitch 185 remain substantially the same (e.g., within about ±10 percent) for all of the lines 120. As a consequence, the prism angles 160, 162, 164, remain unchanged between the lines 120 across a vertical length 330 of the screen 100.

One advantage in configuring the lines 120 to increase in size as a function of increasing distance 320, 325 away from the light 150 is that a greater AOI 152 can be used than otherwise possible using a constant-size configuration of lines 120. This, in turn, can permit a decrease in the throw distance 157. In some cases, e.g., the AOI 152 can be as high as about 88 to 90 degrees. By configuring the lines 120 to increase in size as a function of increasing distance 320, 325, the light 150 can still able to substantially contact the draft surfaces 125 and thereby get refracted into the prismatic lines 120 as discussed above in the context of FIG. 1. In some preferred embodiments, the size of the lines 120 are increased such that the light 120 substantially misses the tips 330 of the grooved lines 120. E.g., the bulk of the light 150 (e.g., at least about 90 percent) preferably contacts the lowermost 95 percent of the draft surface's length 180, and more preferably, an about 95 to 80 percent lower-most portion 335. Adjusting the size of the lines 120 so the light 150 substantially misses the tips 330 can substantially mitigate undesirable reflections or refractions from the tips 330. Such undesirable reflections or refractions may occur for tips 330 that were imperfectly shaped (e.g., rounded) due to manufacturing imperfections or mishandling the film 105.

As illustrated in FIGS. 1-5 in some embodiments, the outside surface 115 of the screen can be a substantially flat screen. The term substantially flat as used herein means that the screen has a generally flat appearance when viewed on a macroscopic scale (e.g., without the aid of magnification aids) and is free of local waves or irregularities. For instance, in some embodiments there are no local areas of the screen that extend in or out from the plane of the screen by more than about 2 mm. Having a substantially flat screen facilitates projecting an image on the screen that is free of distortions. In some cases, it is desirable for the screen to comprise materials (e.g., plastics) that are stretchable (e.g., at least about 0.1 percent in one or both vertical and horizontal dimensions 510, 515, FIG. 5) because then the screen can be stretched to improve its flatness. However, in other embodiments, the outside surface 115 can have a convex or, more preferably, concave shape.

Figure 4:
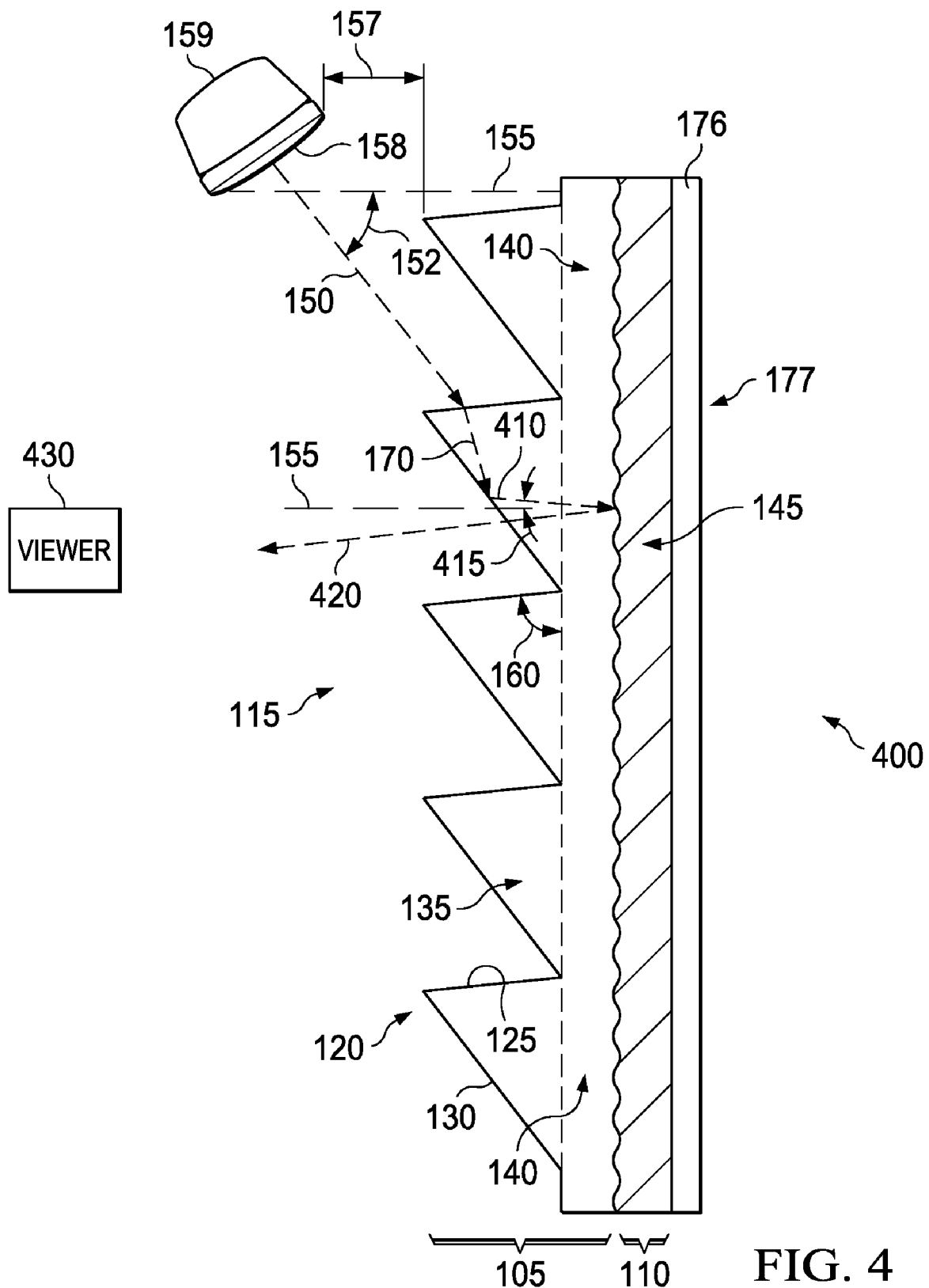
FIG. 4 show a cross-sectional view of the example front-projection screen depicted in FIG. 1 at selected stages in an example the method of front-projection in accordance to the principles of the disclosure.

Another aspect of the present disclosure is a method of using the screen of the disclosure. FIG. 4 shows a cross-sectional view of an example front-projection screen in an example method of front-projection in accordance to the principles of the disclosure.

The method includes providing a front projection screen 400 (FIG. 4). For illustrative purposes, a screen 400 analogous to that presented in FIG. 1 is presented and the same reference numbers are used to depict analogous features. However, any embodiments of the screen 400 discussed above in the context of FIGS. 1-3 can be used in the method.

For instance, the screen 400 includes a prismatic film 105 having an outside surface 115, which includes parallel prismatic grooved lines 120. Each of the lines 120 has a draft surface 125, a groove surface 130, and, each of the lines 120 are located on a first side 135 of a base portion 140 of the film 105. A draft-base angle 165 is about 75 degrees or greater. The screen 400 also includes a diffuser-reflector layer 110 adjacent to a second opposite side 145 of the base portion 140.

FIG. 4 also shows the screen 400 after being oriented such that the outside surface 115 receives incoming light 150 from a front projecting mechanism 159 exclusively through the draft surfaces 125 of the lines 120, when the incoming light 150 has an AOI 152 of about 60 degrees or greater.

FIG. 4 shows the screen 400 while refracting substantially all (e.g., at least about 90 percent of a total flux) of the light 150 entering the draft surfaces 125 to the grooved surfaces 130 of the lines 120. The amount of refracted light 170 that is refracted to the grooved surfaces 130 can be determined by, for example, measuring the brightness level of an image reflected off the screen in the presence and absence of the film 105. Moreover, the amount of light 170 being refracted can be maximized for a particular AOI 152 by adjusting the draft-base angle 160 of the lines 120 to a particular value, or, to within a narrow range of values, such as described above in the context of FIG. 1.

FIG. 4 also shows the screen 400 while reflecting substantially all of a light 410 (e.g., at least about 90 percent of a total flux of the draft surface refracted light 170) from the grooved surface 130 to diffuser-reflector layer 110. As noted above, such reflection is facilitated when the grooved surface 130 a total-internal-reflection surface. In some embodiments the dimensions of the film 105 (e.g., one of more of the internal angles 160, 162, 165) so that the draft-surface reflected light 410 has a non-perpendicular angle of incidence 415 with respect to the diffuser-reflector layer 110. Having a non-perpendicular angle 415 reduces the amount of light that is retro-reflected back to the light source 159. For example in some embodiments the angle 415 is in a range of about 1 to 5 degrees from the normal 155.

FIG. 4 further shows the groove-surface-reflected light 410 being reflected as a light 420 from the diffuser-reflector layer 110 and out of the film 105 to a target viewer location 430 on the same side of the screen 400 as the projection mechanism 159. The diffuser-reflector-layer-reflected light 420 has a reduced degree of vertical divergence. That is, the light 420 reflecting off of the diffuser-reflector layer 110 and out of the film 105 has reduced divergence in a vertical dimension as compared to the divergence of the light 110 in a horizontal dimension of the screen 400.

Figure 5:
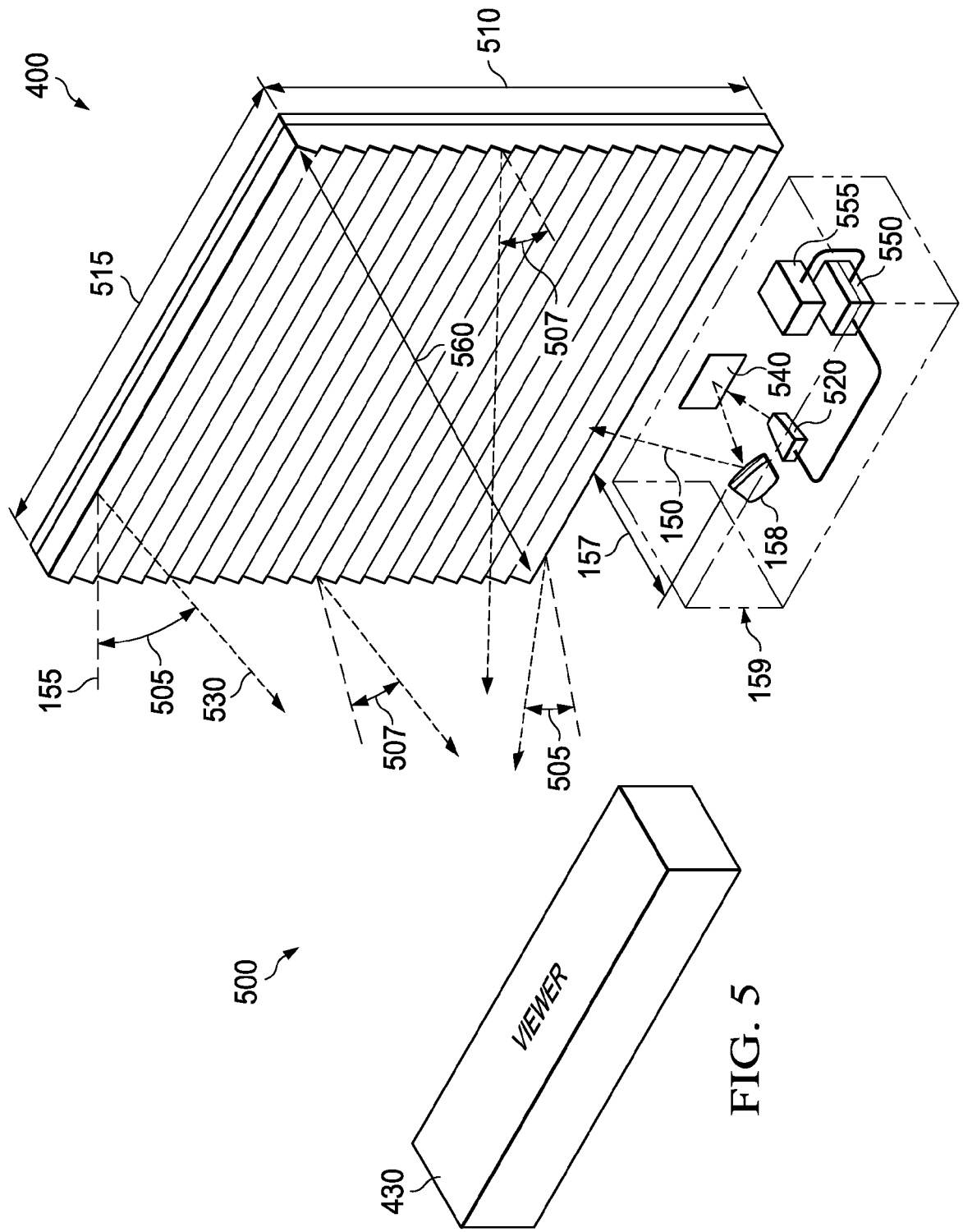
FIG. 5 is a perspective view of a schematic representation of an example PVD system that incorporates an embodiment of a front-projection screen constructed according to the principles of the disclosure.

To further illustrate the relatively smaller degree of vertical divergence compared to horizontal divergence of the diffuser-reflector layer reflected light 430, FIG. 5 presents a perspective view of the example screen 400, viewer location 430 and front projection mechanism 159, while projecting the light 420 from the screen 400. As further disclosed below, the screen can be part of a PVD system 500.

In some embodiments, e.g., substantially all (e.g., at least about 90 percent of the total flux) of the diffuser-reflector-layer reflected light 430 is constrained to a vertical viewing angle 505 of about ±30 degrees relative to the normal 157 of the screen 400. Therefore, the light 110 reflected off the screen 400 and returned to the viewer 430 has a reduced amount of divergence in the vertical dimension 510 as compared to a horizontal dimension of the screen 400. In comparison, for the same embodiments, substantially all (e.g., at least about 90 percent of the total flux) of the diffuser-reflector layer reflected light 430 has a horizontal viewing angle 507 of at least about ±60 degrees relative to the normal 157.

FIG. 5 also illustrates another aspect of the present disclosure: a PVD system 500. The PVD system 500 includes a projection mechanism 159 and the projection screen 400. Any of the embodiments of screens disclosed herein can be incorporated into the PVD system 500. The screen 400 includes the prismatic film 105 having an outside surface 115 that includes parallel prismatic grooved lines 120, and diffuser-reflector layer 110, such as described in the context of FIGS. 1-4. The film 105 and diffuser-reflector layer 110 can be made of any conventional materials commonly used in the optical projection arts. In some cases, for instance, the prismatic film 105 is composed of a molded plastic film laminated to the diffuser-reflector layer 110 which is composed of a white mat fabric or metallic grey material coating. In some embodiments, the film 105 is made of a molded plastic material, such as a polymethylmethacrylate, (e.g., CLAREX®, manufactured by Nitto Jushi Kogyo Co., Tokyo, Japan).

One skilled in the art would be familiar with the various components the projection mechanism 159 could have. For instance, the projection mechanism 158 can include a light source 520, a projection structure 158, a digital micro-mirror device (DMD) 540, DMD control circuitry 550, and video stream 555. The light source 520 can be configured to generate light 150 by methods well known to those skilled in the art. The plurality of mirrors of the DMD 540 can be configured to receive and reflect portions of the light 150 toward or away from the projection structure 158. In some embodiments, projection structure 158 is catadioptric with a front aspheric mirror and the DMD 540 is an array Digital Micro mirror Device™ array (DMD™, Texas Instruments, TX). The DMD control circuitry 550 is coupled to the DMD 540 and configured to control the DMD 540 in response to data derived from the video stream 555. One skilled in the art would be familiar with other embodiments, the projection mechanism 158 and it components could have to facilitate light 150 projection to the screen 400. Other example PVD systems are described in U.S. patent application Ser. No. 11/693,343, filed Mar. 29, 2005 and titled, "Optical System for a Thin Low-Chin Projection Television".

The characteristics of the screen 400 permit the system 500 to have a much shorter TD 157 (e.g., the distance between the projection structure 158 and the outer surface 115, FIG. 1) than hither-to possible. For instance, the AOI 153 (FIG. 1) can be in a range of about 60 degrees or greater to less than 90 degrees. The screen's characteristics allow a substantial reduction in the TR for a broad range of screen sizes. For example, in some embodiments, the TR ranges for the projection mechanism 159 and screen 400 is less than about 0.3, and in some cases, in a range from about 0.3 to 0.1. For example, in such embodiments, where the screen's 400 diagonal distance 560 is about 110 cm, the TD 157 can range from about 35 to 10 cm, respectively.

Those skilled in the art to which the invention relates will appreciate that other and further additions, deletions, substitutions and modifications may be made to the described embodiments without departing from the scope of the invention.

What is claimed is:

1. A front-projection screen, comprising:
   a prismatic film that comprises an outside surface of said screen, said film including parallel prismatic grooved lines, wherein each of said lines have a draft surface, a groove surface and each of said lines are located on a first side of a base portion of said film; and
   a diffuser-reflector layer adjacent to a second opposite side of said base portion, wherein:
   said outside surface is oriented to receive an incoming light exclusively through said draft surfaces of said lines and the incoming light has an angle of incidence of about 60 degrees or greater with respect to the normal of said outside surface, and a draft-base angle between said base portion and said draft surface is about 75 degrees or greater.

2. The screen as recited in claim 1, wherein each of said groove surfaces are substantially total-internal-reflection surfaces with respect to said light refracted from said draft surfaces to said groove surfaces.

3. The screen as recited in claim 1, wherein a surface of said diffuser-reflector layer adjacent to said second side of said film is selected from the group consisting of: a smooth substantially diffusive surface, a substantially reflective roughen surface, or a partially diffusive and partially reflective surface.

4. The screen as recited in claim 1, wherein said draft-base angle is in a range from about 86 to 88 degrees.

5. The screen as recited in claim 1, wherein a groove-base angle of said lines is in a range from about 40 to 50 degrees.

6. The screen as recited in claim 1, wherein a surface of said diffuser-reflector layer that is adjacent to said common base includes micro-features that have an average peak-to-valley distance and an average peak-to-peak distance that are both about 0.1 or less than a target pixel dimension to be projected on said screen.

7. The screen as recited in claim 6, wherein said target pixel dimension is about 1 mm$^2$ and said peak-to-valley distance and said peak-to-peak distance are both about 100 microns or less.

8. The screen as recited in claim 6, wherein said average peak-to-peak distance is large enough to avoid geometric scattering of said light projected onto said outside surface.

9. The screen as recited in claim 1, wherein each of said prismatic grooved lines have substantially identical dimensions for all of said screen.

10. The screen as recited in claim 1, wherein dimensions of said prismatic grooved lines increase as a function of an increasing distance away from said incoming light, but said dimension remain constant relative to each other.

11. The screen as recited in claim 10, wherein said increase as said function includes a linear increase in said dimensions as a function of increasing said angle of incidence.

12. A method of front-projection, comprising:
providing a front projection screen that includes:
a prismatic film having an outside surface which includes parallel prismatic grooved lines, wherein each of said lines have a draft surface, a groove surface and each of said lines are located on a first side of a base portion of said film and wherein a draft-base angle between said base portion and said draft surface is about 75 degrees or greater, and
a diffuser-reflector layer adjacent to a second opposite side of said base portion;
orienting said screen such that said outside surface receives light from a front projection mechanism exclusively through said draft surfaces of said lines, when said incoming light has an angle of incidence, with respect to the normal of said outside surface, of about 60 degrees or greater;
refracting substantially all of said light from said draft surfaces of said lines to said groove surfaces of said lines;
reflecting substantially all of said draft-surface-refracted light from said grooved surface to said diffuser-reflector layer; and
reflecting said groove-surface-reflected light from said diffuser-reflector layer and out of said film to a target viewer location on a same side of said screen as said front projection mechanism, wherein said diffuser-reflector-layer-reflected light has reduced divergence in a vertical dimension as compared to a horizontal dimension of said screen.

13. The method as recited in claim 12, wherein substantially all of said diffuser-reflector-layer-reflected light is constrained to a vertical viewing angle of about ±30 degrees.

14. The method as recited in claim 12, wherein substantially all of said diffuser-reflector-layer-reflected light has a horizontal viewing angle of at least about ±60 degrees.

15. A projection visual display (PVD) system, comprising:
a projection mechanism, including:
a light source configured to generate light,
a projection structure,
a digital micro-mirror device (DMD) configured to receive and reflect portions of said light toward or away from said projection structure, and
DMD control circuitry coupled to said DMD and configured to control said DMD in response to data derived from a video stream; and
a projection screen, including:
a prismatic film having an outside surface that includes parallel prismatic grooved lines, wherein each of said lines have a draft surface, a groove surface and each of said lines are located on a first side of a base portion of said film; and
a diffuser-reflector layer adjacent to a second opposite side of said base portion, wherein:
a draft-base angle between said base portion and said draft surface is about 75 degrees or greater, and
said outside film surface is oriented to receive said light exclusively through said draft surfaces of said lines when said light has an angle of incidence with respect to the normal of said outside surface of about 60 degrees or greater.

16. The system as recited in claim 15, wherein a throw ratio for said projection mechanism and said projection screen is less than about 0.3.

17. The system as recited in claim 15, wherein said throw distance is in a range from about 35 to 10 cm for said screen having a diagonal diameter of about 110 cm.

18. The PVD system as recited in claim 15, wherein said incidence angle is in a range of about 60 degrees or greater to less than 90 degrees.

19. The PVD system as recited in claim 15, wherein said screen includes said prismatic film composed of a molded plastic layer laminated to said diffuser-reflector layer which is composed of a white mat fabric.

20. The PVD system as recited in claim 15, wherein said screen includes said prismatic film composed of a molded plastic layer and a metallic grey material coating said second side.

* * * * *